May 18, 1937.  O. W. LEE  2,080,614
ASTIGMATOMETER
Filed Oct. 9, 1934  2 Sheets-Sheet 1
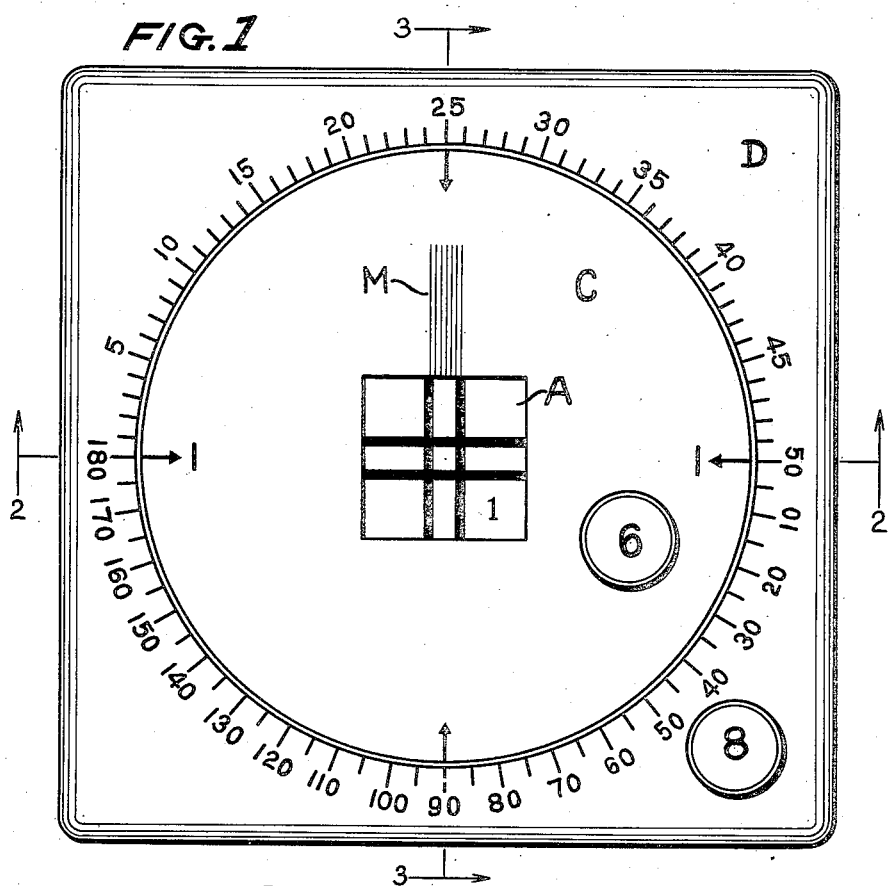
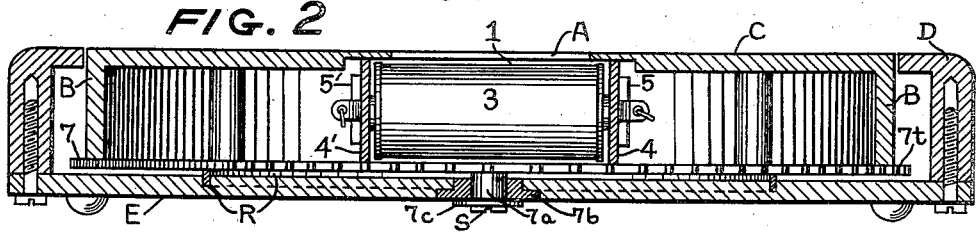
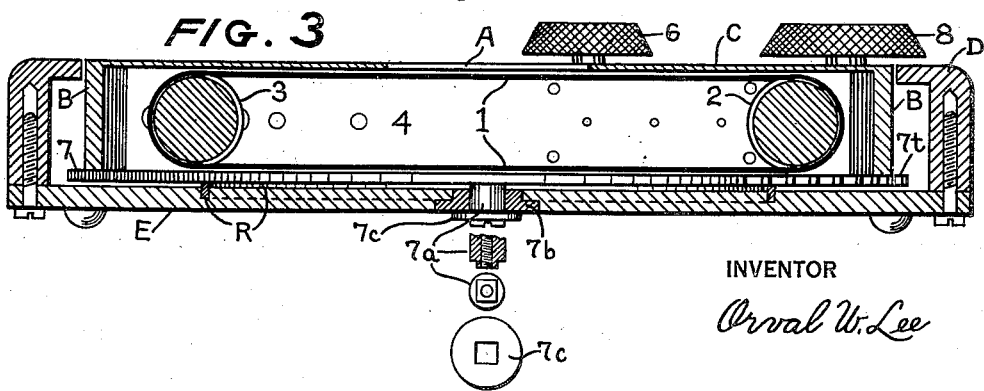
INVENTOR
Orval W. Lee INVENTOR
Orval W. Lee Patented May 18, 1937

2,080,614

UNITED STATES PATENT OFFICE 2,080,614

ASTIGMATOMETER

Orval W. Lee, Spokane, Wash.

Application October 9, 1934, Serial No. 747,549

16 Claims. (Cl. 88—20)

My present invention relates to an improved astigmatometer of the rotatable type for use by oculists and optometrists for determining the meridian or axis of an astigmatic defect in the human eye and it can also be used in conjunction with cylindrical lenses to determine the amount of astigmatism. In carrying out my invention I provide an optical appliance affording selectivity of a plurality of astigmatic-test-media of several graduated sizes, each alternately adjustable to operative position and also rotatable upon a common central axis. The appliance is small, compact and light in weight whereby it can conveniently be placed in the required operative position or temporarily removed when not in use. This selectivity, rotation and compactness is attained by the novel arrangement of an endless screen-belt upon rollers mounted upon a turnplate whereby selectivity and rotation can be accomplished independent of each other and whereby several selections of test-media are provided in an appliance small in size.

Means are provided to move the endless screen-belt upon the rollers and the combination and arrangement of the parts of the appliance affords the required adjustments enabling the operator to position any of the test-media before an observation aperture and to rotate said test-media as required.

Means are provided to indicate the position of rotation and to locate the axis of the cylindrical lens required to correct the astigmatic error of the eye.

Due to the simplicity of construction and operation of the various parts of the appliance, selectivity can quickly and easily be attained and the rotation can be accomplished gradually and accurately.

Means are provided for detachably retaining the screen-belt upon the rollers whereby it can be removed, replaced or renewed with ease.

Means are provided to automatically compensate for variations in the length of different screen-belts and for expansion or contraction due to various causes, thereby eliminating the necessity of adjustments and thereby maintaining the screen-belt taut upon the rollers, free from sag, slipping and lost motion.

By the utilization of the appliance of my invention any skilled person can conveniently determine the presence of astigmatism in the human eye and accurately locate the axis of the cylindrical lens required to correct the indicated astigmatism. By employing concave cylindrical lenses before the eye examined, the operator can accurately determine the quantity or amount of astigmatism present.

The parts of the appliance are so coordinated as to perform their functions accurately and any skilled person can conveniently operate the appliance without difficulty.

The invention consists of certain novel combinations and arrangements of parts and the astigmatic test-media, as will hereinafter be more fully set forth and claimed. It will be understood that the invention is not restricted to the exact structure herein illustrated and described, but that modifications may be made in the disclosed structure without departing from the principles of the invention and the intent of the claims. In the accompanying drawings I have illustrated one preferred example of the physical embodiment of my invention.

Figure 1 is a face view of the invention.

Figure 2 is a sectional view taken on the line 2—2 of Figure 1.

Figure 3 is a sectional view taken on the line 3—3 of Figure 1.

In determining the refraction of the human eye it is of utmost importance that the astigmatic error be accurately determined. The amount of astigmatism and the position or rotation of the axis should be determined with the greatest accuracy possible. Improper correction of the astigmatic error may result in an error of the spherical correction, or in an error of the presbyopic correction and may variously affect the coordination of the extrinsic muscles of the eye.

Numerous devices are used to determine the astigmatic error, the most common being a fan-like arrangement of radiating lines, multiple sets of triple parallel lines radiating to the hour designations on a clock dial, and a network of intersecting lines forming a right angle lattice. In each of the mentioned devices the lines are of considerable width that they may be readily visible when vision does not approximate normal, this of course detracts from their accuracy in determining small amounts of astigmatism in an eye that approximates normal vision. Each of such devices being of liberal size and composed of a multiplicity of lines, the fixation wanders from one part of the test-media to another with the result that parts of the test-media are sometimes sufficiently removed from the central field of vision to cause a part to appear indistinct when that part would appear distinct in the central field. The multiplicity of lines often proves confusing to an uninformed patient and vague responses result. Some patients are not sufficiently observing to determine when the right angle lattice is, "rhomboid, zig-zag, cane-seat, or honey-comb" in appearance and slight variations escape their notice.

Obviously one size of test-media can not suffice to accurately determine astigmatic errors under the wide variations of vision that accompany different amounts of astigmatic defect.

In carrying out my invention I provide a plurality of astigmatic test-media of simplified form and of several graduated sizes and thereby eliminate the objectional features previously mentioned. For each size of test-media, I prefer to use not more than two parallel lines L, L, intersected at right angles by the same number of like lines T, T. The width of the paired lines preferably subtend an angle of ½ minute, 1 minute, 3 minutes and 5 minutes respectively and preferably the ½ and 1 minute lines are separated by a space of 3 minutes, the 3 minute lines separated by a 5 minute space and the 5 minute lines by a 7 minute space. The purpose of this separation is to assure that the lines will not coalesce when they are seen indistinctly. Preferably the observed length of any line of the test-media should not be greater than will subtend an angle of 30 minutes or ½ of one degree of a circle, that the entire configuration may be distinctly seen within the central area of fixation. It will of course be understood that by 1 minute is meant, a linear dimension that subtends an angle of one sixtieth of one degree of a circle.

Figure 4:
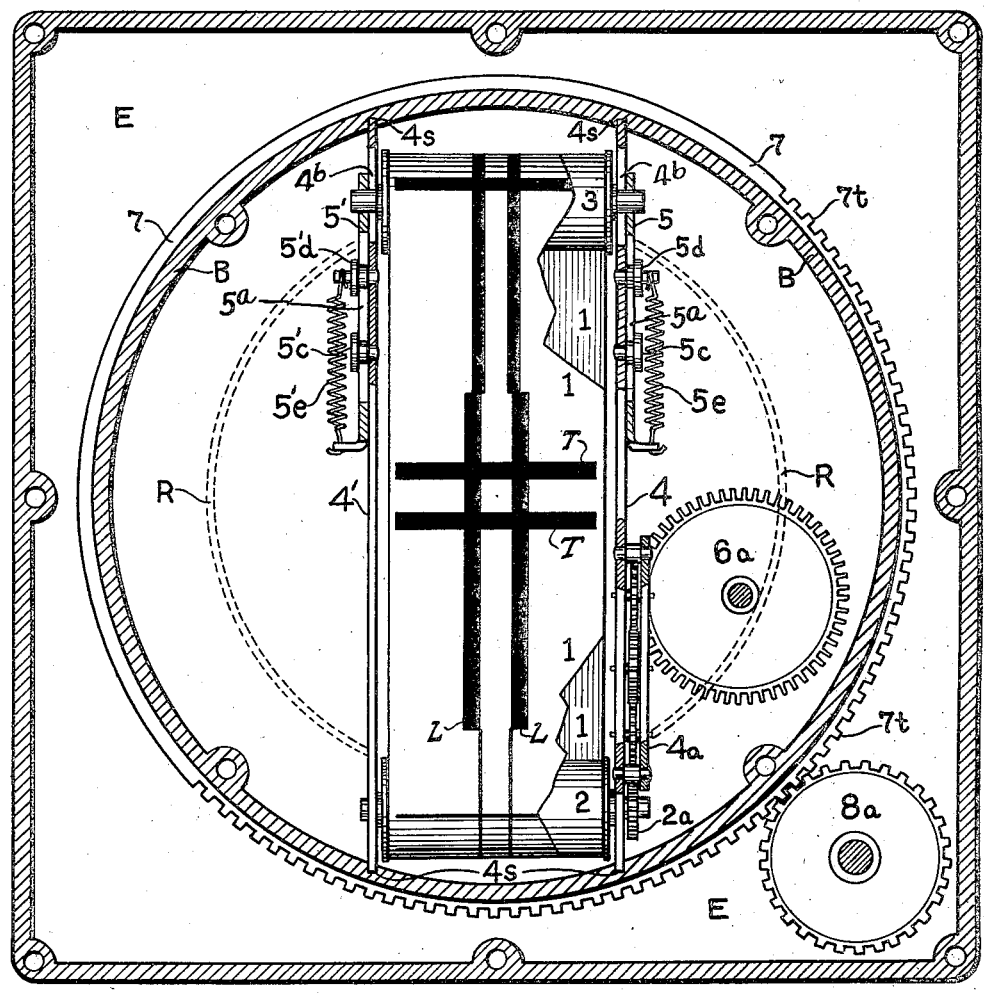
Figure 4 is a plan view of the interior, partly in section disclosing the operative parts of the invention.

As will be seen in Figure 4, in each size of test-media, one pair of lines L, L, is prolonged beyond its intersection sufficiently to provide an extension which will reach across said observation aperture, when positioned thereat. In this manner two forms of the same size test-media are provided in a minimum amount of space. In this drawing an approximate comparison of the largest and the smallest test-media will be seen and it will also be seen that the several test-media are closely joined, thereby affording a compact arrangement upon the screen-belt and also minimizing the manipulation necessary to effect size selection. From the foregoing description it will be seen that the operator has at instant command a wide variation of test-media sufficient to meet the wide variation of vision that accompanies different amounts of astigmatism. It is important that the test-media be rotated gradually, for the reason that a rapid rotation of astigmatic-test-media produces an objectionable and confusing kaleidoscope effect; furthermore a rapid rotation of astigmatic-test-media precludes accurate determining of the position of the astigmatic axis. For these sufficient reasons the appliance of my invention is arranged to afford an even and gradual rotation of the test-media. The utilization and employment of this simplified form of test-media will hereinafter be fully set forth in detail.

Figure 5:
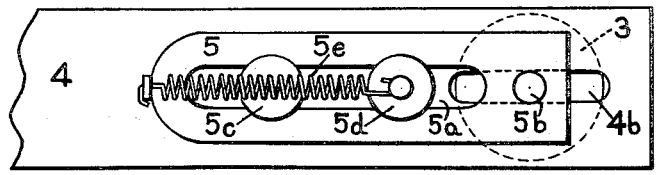
Figure 5 is an enlarged detail view, disclosing the relation of the slidable bearing-plate, frame plate, roller and co-acting parts.

In carrying out my invention I provide a number of graduated sizes of astigmatic test-media upon a movable screen fashioned as an endless belt 1 that passes around a pair of flanged rollers 2, 3. The roller 2 is journaled in the frame plates 4, 4', and the roller 3 is journaled in the slidable bearing-plates 5 and 5'. As best seen in Figure 5 these slidable bearing-plates are provided with a slot 5a and a journal bearing 5b and the frame plate 4 is provided with a bearing slot 4b. As seen in Figures 4 and 5 the bearing-plate 5 is slidably mounted upon the frame plate 4 by means of the guide-posts 5c, 5d that pass through the slot 5a and are rigidly secured to the frame plate 4. These posts have flanges to retain the bearing-plate in position and the post 5d has a projecting pin to which one end of the spring 5e is secured, the other end of this spring is connected to an angular extension on the bearing-plate 5. It will be seen that the shaft of the roller 3 passes through the slot 4b and is journaled in the bearing 5b of the plate 5 which is slidable upon the posts 5c, 5d and that the spring 5e will move the bearing-plate 5 towards the end of the frame plate 4 and of course move the roller 3 away from the roller 2. Both ends of the roller 3 being similarly mounted, the paired springs 5e, 5e' maintain constant tension on the endless screen-belt 1 to keep it taut and prevent slipping upon the roller. This arrangement automatically compensates for minor variations in the length of different screen-belts and also for expansion and contraction due to atmospheric conditions or other causes and requires no attention from the operator. It will be seen in Figure 4 that the frame plates 4, 4' are held in fixed position by engagement in the spaced slots 4s, 4s, 4s, 4s in the casing B. From this description it will be seen that the frame plates 4 and 4' are not and need not be secured to each other nor to the rollers. The device being small, these parts can quickly and easily be lifted out of their position and be readily disassembled when required for any reason and be reassembled with equal facility, entirely without the necessity of a single tool and without mechanical skill. As will be seen in Figure 2 the inner side of the face plate C is recessed to receive these parts and thereby bring the test-media as close to the observation aperture A as is practical. The roller 2 is provided with a gear 2a pinned to its shaft. A bearing plate 4a is secured to the frame 4 to provide support to journal the bearings of a number of intermediate gears used for the purpose of spacing. These gears are turned by the gear 6a which is provided with a control knob 6. It will be seen that the knob 6 may be used to rotate the rollers and thereby position selected portions of the screen-belt 1 to view before the aperture A in the dial C which forms the face plate of the casing B. As will be seen in Figures 2 and 3 the dial C is outermost, the screen-belt upon the rollers in their frame being placed in their proper position from the underside or back of the device. These parts are securely held in position by a turnplate 7 attached to the casing B. The edge of this turnplate is provided with gear teeth 7t upon one-half of its circumference, these engage with the gear 8a which is controlled by the knob 8. As best seen in Figure 3 this turnplate is provided with a shaft 7a, having a short, square extension with a threaded core; a washer 7c is provided for the square end of the shaft. The base E is centrally provided with an outwardly flanged journal bearing 7b and internally provided with an annular bearing R. The turnplate 7 is supported upon the annular bearing R and the shaft 7a is journaled in the bearing 7b, the washer 7c engages the square end of the shaft 7a and the parts are secured in position by the screw S which turns with the washer and the shaft and of course this means of attachment will not be loosened by the friction of the rotating parts. The casing D which forms the outer face plate, is secured to the base E thereby enclosing the entire mechanism, the control knobs 6 and 8 of course being placed exteriorly for accessibility.

It will be obvious that the knob 6 can be used to position the astigmatic-test-media before the observation aperture A and the knob 8 can be used to rotate the dial C within the face-plate D which is provided with a double dial. One half of the dial D is provided with radial graduations of degrees of a circle, each 10 degrees being numbered and each 5 degrees being marked. The other half of the dial D is provided with radial graduations of percentage rotation, each one hundredth part of the circumference of the circle being marked and each five divisions being numbered. This latter percentage graduation is of my own invention; heretofore the circumference of a circle has universally been measured by the 360 degrees of a circle. The liberal fractional divisibility of 360 is of advantage for certain purposes, but such fractional divisibility is not of advantage in ophthalmic equipment. Ophthalmic equipment is necessarily small, much of it being used upon the face of the person being examined and therefore such devices as trial frames, rotary prisms, phorometers and the like can not conveniently provide more than 1½ inch or 2 inch dials for indicating the position of cylinders and prisms. Such restricted size of dial does not provide the necessary space for 360 radial divisions and the graduations are usually restricted to marking each 5 degrees and even when the numbering is restricted to each 15 degrees there is crowding of the numbers due to the three digits required. Obviously, 1 per cent of the circumference of a circle is equivalent to 3.6 degrees and it will be seen that the percentage dial illustrated in Figure 1 represents an easily readable scale of smaller than 5 degree graduations. Manifestly when such percentage dial is used on other ophthalmic equipment having a 1½ inch or a 2 inch dial, it is possible to preserve all of the single divisions and use numerals of a clearly legible size without undue crowding, in contradistinction to the universally used 360 degree graduation. This percentage graduation is of course readily comprehensive to both the layman and the professional.

The rotatable dial C is provided with a marking parallel to one set of the lines of the astigmatic-test-media, such marking consists of an elongated red area indicated by the parallel lines at M. The purpose of this mark is to serve as an indicator as to which set of the astigmatic-test-media lines are referred to by the examiner and by the patient and thereby render the statements of each definitely comprehensive. The purpose of the red color of the mark is explained by the well known fact that red is the most readily visible to the myopic eye, and as it is the general custom and advisable to determine the astigmatic defect of the human eye under a dioptric condition of slight myopia, it will be readily understood that this broad band of red is a readily visible indicator. The rotatable dial C is also marked quarterly at the circumference upon the diameters parallel to the intersecting lines of the astigmatic-test-media which of course rotate with the dial C; the marks that are parallel to the red indicator designate the position of the most myopic meridian and the marks at right angles are accompanied with an indicator — (minus) to designate the axis of rotation of the proper position of a concave cylindrical lens when used to correct the stigmatic error of the eye examined.

The appliance illustrated is designed for use especially with the ophthalmic deflector described in my own patent application 676,454 filed June 19, 1933 which matured into Patent No. 2,003,806 granted June 4, 1935 and when the appliance is used by reflection from a single mirror it is of course necessary to graduate the dial D counter-clockwise.

As an example of the practical application and use of the appliance of my invention; the observations are made at a designated distance, preferably either at 5 meters or at 6 meters and preferably by use of the previously referred to ophthalmic deflector. The examiner first corrects as much of the spherical error of refraction as is practical, using whatsoever method is desired. The astigmatometer of my invention is then exposed to the monocular view of the patient at the previously designated distance, care being exercised that no meridian of the eye is hypermetropic, but it is by no means necessary to have more than one meridian of the eye myopic and as visibility is better when all of the spherical error has been corrected it is possible to employ the smaller and more accurate astigmatic-test-media when the meridians at right angles to each other are emmetropic and myopic respectively. The largest of the astigmatic-test-media is exhibited to the patient and attention directed to the pairs of cross lines at right angles to each other and to the red indicator; this exhibit being for the purpose of familiarizing the patient with what is to be expected; the pair of parallel lines running in the direction of the red indicator are also exhibited for the same reason. The examiner may make use of the indications of the ophthalmometer and retinoscope and position the lines of the astigmatometer at such indicated axis or rotation for convenience of both himself and the patient. The knob 6 is now turned to position the smallest of the astigmatic-test-media to the monocular view of the patient, each succeeding larger graduation is promptly presented until the patient declares that two lines or four lines are seen, the examination being conducted with the smallest graduation which is visible to the patient. When the patient can see two of the four lines, or two distinctly and two dimly or faintly, astigmatic error is a certainty. Inquiry is made to determine if the more distinct lines are continuous with the red indicator and should such not be the case the knob 8 is turned to rotate the lines so that the more distinct lines will be continuous with the red indicator, care being exercised to locate the most distinct position of rotation. Knob 6 is now turned to bring the adjoining pair of lines before the observation aperture which of course are always continuous with the red indicator and should the patient at this axis or rotation be able to see a pair of lines of smaller size, the smallest size possible should be used for the final determination. The lines are now rotated by turning knob 8 until they disappear and if the smallest graduation possible is employed they will disappear upon slight rotation from their correct position; the knob 8 is then turned in the opposite direction and the patient instructed to say "aye" when the lines are seen to be in their most distinct position. When the described technique is employed the correct axis or rotation can be determined with remarkable accuracy even in very slight astigmatic defects. Written record is made of the axis or rotation and the knob 6 is then turned to position the intersecting lines of the same size before the observation aperture at the recorded axis or rotation, whereupon the patient of course sees only the lines continuous with the red indicator, that is to say two lines when four are present. The examiner now adapts concave cylindrical lenses to the eye examined and placed with the axis of the cylinder at right angles to the red indicator, that is to say at the graduation on dial D, indicated by the line marked — on the dial C. The examiner determines the concave cylindrical lens that produces equal distinctness of all four lines and when this is accurately determined, the lines of the astigmatometer will appear equal irrespective of rotation. It should be mentioned at this point that the cylinders should not be rotated before the eye being examined, nor the astigmatometer rotated when a cylinder is before the eye at any other than the indicated axis, because of the good and sufficient reason that an eye with a cylindrical error in combination with a cylindrical lens at any other than the proper axis produces a condition of rotary cross cylinders which of course results in a sphero-cylindrical combination of a different axis due to the fact that the cylindrical lens is rotated and the cylindrical error of the eye is not rotatable. The astimatometer is a complete, definite and accurate indicator of the axis or rotation of the astigmatic error and can be relied upon with a sense of security; and to introduce the conflicting error of rotating either the lines or the cylinder from their manifestly correct position will produce confusion and inaccuracy. The position or rotation of the axis requires no verification. The quantity or amount of cylindrical lens required to correct the astigmatism may be verified by adding sufficient convex spherical lens to slightly blur the smallest astigmatic-test-media visible after the astigmatic error is corrected with a concave cylindrical lens; should this cause both pairs of intersecting lines to blur equally, the astigmatism is properly and accurately corrected and should one pair blur more than the other, they should be equalized by the required cylindrical lens. It should also be understood that if at any time during the examination an addition of a convex spherical lens produces a reversal of the blurred and distinct lines it is evidence that the eye is hypermetropic and a pseudo-myopic condition is being produced by contraction of the ciliary muscle; of course the condition should be forthwith corrected with the required amount of convex spherical lens. Likewise, a spontaneous reversal of the blurred and distinct lines is an indication of spasmodic contraction and relaxation of the ciliary muscle, also requiring the addition of a suitable convex spherical lens. When the smallest intersecting lines visible to the patient can be rotated one quarter of the circle without variation of visibility and when the same condition exists after the addition of a toleratable amount of convex spherical lens, there is certainty that no uncorrected astigmatism exists.

Obviously the astigmatometer of my invention is intended for use by those who are skilled in ophthalmic refraction and as it is intended to provide a precise indication of the rotation or axis of the astigmatic error of the human eye and a means of accurately correcting the indicated astigmatism, its operation requires skill and technique to afford accuracy. However, the simplicity of the device and the ease with which it can be operated, together with the wide range of adaptability of the astigmatic-test-media to the different variations of vision that are associated with different astigmatic defects makes it a useful and valuable instrument that can be conveniently operated without difficulty by any person skilled in ophthalmic refraction.

The herein disclosed protractor having hundredth radial divisions, is made a part of my copending application Serial No. 35,120. In the present invention, I claim:—

1. An optical appliance comprising a rotatably mounted casing, a pair of frame plates removably mounted in guideways in said casing, a pair of rollers journaled in said frame plates, a screen-belt upon the rollers, ophthalmic test-media upon the screen-belt, means for rotating the rollers thereby moving the screen-belt and means for revolving the casing together with the previously mentioned parts.

2. An optical appliance comprising a rotatably mounted casing, a pair of separate frame plates removably mounted in guideways in the casing, a pair of rollers, bearing supports upon the frame plates for said rollers, a screen-belt upon the rollers, means for automatically spacing the rollers, means for rotating the rollers and means for rotating the casing.

3. An optical appliance comprising a cylindrical casing having a face plate with a central aperture therein, a pair of separate frame plates, guides adapted to removably secure said frame plates in parallel relation within said cylindrical casing, a pair of rollers journaled in said frame plates, an endless screen belt upon said rollers, means for turning said rollers, a plate closing the rear of said cylindrical casing and carrying an axial shaft, an enclosing casing having an aperture adapted to receive said cylindrical casing and carrying a bearing support for said shaft, means for rotating said cylindrical casing and means for indicating the rotation relative to said enclosing casing.

4. An optical appliance comprising a cylindrical casing fashioned with a face plate having a central aperture therein, a pair of separate frame plates held in parallel relation by guide ways within said cylindrical casing, a pair of rollers journaled in said frame plates, an endless belt trained around said rollers, astigmatic test-media upon said belt, said frame plates being held in said guideways by a turnplate secured to said cylindrical casing, said turnplate being fashioned with peripheral teeth and a central shaft, a base member carrying a journal bearing for said shaft, an annular bearing supporting said turnplate free of said base member, means for securing said shaft in said journal bearing, an enclosing casing secured to said base member and fashioned with an aperture concentric with said cylindrical casing, turnplate and bearings, a gear journaled in said enclosing casing and adapted to rotate said turnplate, a gear journaled in said cylindrical casing and adapted to turn said rollers, a control knob for each of said gears, and means for indicating the rotation of said cylindrical casing relative to said enclosing casing.

5. In an appliance for optical use; the combination of a casing rotatable within a casing, a centrally located observation aperture in the rotatable casing, a removable frame within the rotatable casing, a pair of automatically spaced rollers journaled in the removable frame, an endless screen-belt upon the rollers, test-media upon the screen-belt, a turnplate secured to the rotatable casing, a shaft for the turnplate, a journal bearing for the shaft, an annular supporting bearing for the turnplate and means for rotating the turnplate together with the casing containing the previously mentioned parts and means to rotate the rollers to position the test-media before the observation aperture and means to indicate the position of the rotatable casing with relation to the stationary casing.

6. In an appliance for optical use; the combination of a turnplate, a shaft for the turnplate, a journal bearing for the shaft, a supporting bearing for the turnplate, a casing secured to the turnplate, a frame within said casing, spaced rollers journaled in said frame, a screen-belt around the rollers, a plurality of test-media upon the screen-belt, an aperture in said casing, means for positioning selected portions of said test-media to said aperture, an outer casing, means for rotating the inner casing with relation to the outer casing and graduated scales to indicate the amount of such rotation.

7. An optical appliance comprising a base member carrying an externally flanged bearing, an annular supporting bearing on the inner face of said base member, a turnplate seating upon said annular bearing and having an axial shaft journaled in said externally flanged bearing and secured in operative relation therewith, a cylindrical casing rigid with said turnplate, a face plate upon said cylindrical casing, an observation aperture in said face plate, a screen-belt upon rollers and aligned with said observation aperture, a gear rigid with one of said rollers, a knob exterior of said face plate and coacting with a gear train adapted to turn said roller, an enclosing casing secured to said base member and having an opening concentric with and adapted to receive said cylindrical casing, peripheral teeth upon said turnplate, a gear journaled in said enclosing casing and meshing with the teeth upon said turnplate, an external knob for turning said latter gear and means for indicating the rotation of said cylindrical casing relative to said enclosing casing.

8. An optical appliance comprising a casing rotatable within a housing, an observation aperture in the rotatable casing, a screen within said rotatable casing and rotatable therewith, said screen being movable across said aperture, a plurality of test-media upon said screen, means for positioning selected test-media before the observation aperture, a turnplate secured to the rotatable casing, a shaft for the turnplate, a journal bearing for the shaft, an annular supporting bearing for the turnplate, means for rotating the turnplate, means for securing the rotatable casing, turnplate, shaft, journal bearing and supporting bearing in said housing, means upon the housing and upon the rotatable casing to indicate the relative rotation of said test-media.

9. An optical appliance comprising a cylindrical casing having an observation aperture in the face thereof, an endless screen belt aligned with said aperture and trained around rollers journaled within said cylindrical casing, a gear rigid with one of said rollers and adapted to turn with a gear operated by a control knob on the exterior of said cylindrical casing, an enclosing casing having an opening adapted to receive said cylindrical casing and having a journal bearing concentric with said opening, a short shaft upon said cylindrical casing and adapted to turn in said bearing, means within said enclosing casing for rotating said cylindrical casing, said rotating means being operated by a control knob on the exterior of said enclosing casing and means for indicating the rotation of said cylindrical casing relative to said enclosing casing.

10. An optical appliance comprising an enclosing casing fashioned with a circular scale and an opening concentric therewith, a cylindrical casing adapted to rotate within said opening, said cylindrical casing being fashioned with a central shaft journaled in the base of said enclosing casing, means connected with a control knob on the exterior of said enclosing casing for rotating said cylindrical casing, a screen belt upon rollers journaled in said cylindrical casing, means connected with a control knob on the exterior of said cylindrical casing for turning said rollers, a central aperture in the face of said cylindrical casing and means for indicating the rotation of the cylindrical casing relative to the enclosing casing.

11. An optical appliance comprising a rotatably mounted casing, a pair of rollers carried by said casing, a belt carried by said rollers, ophthalmic test-media upon said belt, said test-media embodying a pair of parallel bands comprising a number of paired sections disposed longitudinally of said belt and each paired section being of a different width and each paired section being intersected by a pair of parallel transverse bands having the same width as the longitudinal bands of that section, said rotatable casing being provided with an aperture of requisite dimensions to expose a portion of one section of said longitudinally disposed bands only, means for moving said belt upon its rollers to expose a selected portion of one section of longitudinal bands intersected by transverse bands and to alternately expose a selected portion of the same section of longitudinal bands only, means for rotating said casing and means for indicating the relative position of rotation.

12. An optical appliance comprising a rotatably mounted member, a pair of rollers carried by said member, a belt carried by said rollers, ophthalmic test-media upon said belt, said test-media embodying a pair of parallel bands disposed longitudinally of said belt, said bands comprising a number of paired sections, each paired section being of a different width and each paired section being intersected by a pair of parallel transverse bands having the same width as the longitudinal bands of that section, said bands and belt being of a contrasting color combination, a plate having an aperture positioned before said belt, each paired section of said longitudinal bands having a portion prolonged beyond the intersection sufficiently to provide an extension which will reach across said aperture when positioned thereat, means for moving said belt upon its rollers to expose to view the prolonged portion of one section of said longitudinal bands only and to alternately expose to view an intersected portion of the identical longitudinal bands, means for rotating said rotatable member, and means for indicating the relative position of rotation.

13. An optical appliance comprising a movably mounted screen carrying ophthalmic test-media embodying longitudinal lines intersected by transverse lines, a plate member having an aperture positioned before said screen, said longitudinal lines having a portion prolonged beyond the intersection sufficiently to provide an extension which will reach across said aperture when positioned thereat, means to move said screen in the direction of said longitudinal lines to expose to view the prolonged portion of said longitudinal lines only and to alternately expose to view an intersected portion of the identical longitudinal lines, a protractor scale member centered with said aperture, and said screen being also rotatably mounted for turning about said center.

14. An optical appliance comprising a movably mounted screen carrying ophthalmic test-media embodying longitudinal lines intersected by transverse lines, a plate member having an aperture positioned before said screen, said longitudinal lines having a portion prolonged beyond the intersection sufficiently to provide an extension which will reach across said aperture when positioned thereat whereby when said screen is moved in the direction of the said longitudinal lines the aperture can be made to expose to view the prolonged portion of said longitudinal lines only and to alternately expose to view an intersected portion of the identical longitudinal lines.

15. An astigmatometer comprising a rotatably mounted dial having an observation aperture therein, a screen mounted behind said dial and rotatable therewith, said screen carrying a number of graduated sizes of test-media comprising paired parallel lines intersecting paired parallel lines at right-angles, said screen being movable across said aperture, a red indicator upon said dial to designate the position of one pair of lines, a face-plate surrounding said dial, graduations upon the face-plate to indicate the rotation of said dial, means to rotate said dial and lines with relation to the face-plate, means to accomplish size selection of the lines and for adjusting the position of the lines with relation to the observation aperture.

16. An astigmatometer comprising a support, a member rotatably mounted upon said support, a red indicator upon said rotatable member and identifying one diameter thereof, ophthalmic test-media carried by said rotatable member, said test-media comprising visible lines contrasting with the color of said rotatable member and disposed parallel to the diameter identified by said red indicator and similar lines disposed parallel to the diameter at right angles to the diameter identified by said red indicator, means to rotate said member in its own plane, and a graduated scale to register the position of rotation of said red indicator and said lines.

ORVAL W. LEE.